United States Patent [19]

Mier

[11] 4,243,020
[45] Jan. 6, 1981

[54] SOLAR PANEL AND PANEL ASSEMBLY

[76] Inventor: Thomas P. Mier, 194 Shady Ln., Trenton, N.J. 08619

[21] Appl. No.: 953,661

[22] Filed: Oct. 23, 1978

[51] Int. Cl.$^3$ .............................................. F24J 3/02
[52] U.S. Cl. ................................... 126/444; 165/170; 126/450
[58] Field of Search ................. 165/170; 126/444, 445, 126/450, 448

[56] References Cited

U.S. PATENT DOCUMENTS

| | | | |
|---|---|---|---|
| 2,064,141 | 12/1936 | Askin | 165/170 |
| 2,200,426 | 5/1940 | Lehman | 165/170 |
| 2,448,648 | 9/1948 | Zideck . | |
| 3,916,871 | 11/1975 | Estes et al. | 126/444 |
| 3,918,430 | 11/1975 | Stout et al. . | |
| 3,995,615 | 12/1976 | Hojnowski . | |
| 4,007,728 | 2/1977 | Guba . | |
| 4,011,856 | 3/1977 | Gallagher | 126/448 |
| 4,029,080 | 6/1977 | Warren . | |
| 4,056,094 | 11/1977 | Rosenberg . | |
| 4,062,351 | 12/1977 | Hastwell . | |
| 4,068,652 | 1/1978 | Worthington . | |

FOREIGN PATENT DOCUMENTS

| | | | |
|---|---|---|---|
| 2621299 | 11/1976 | Fed. Rep. of Germany | 126/444 |
| 57313 | 4/1946 | Netherlands | 165/170 |
| 938012 | 2/1960 | United Kingdom | 126/444 |

Primary Examiner—Carroll B. Dority, Jr.
Attorney, Agent, or Firm—Frederick A. Zoda; John J. Kane; Albert Sperry

[57] ABSTRACT

A solar panel has a series of channels through which water or other fluids may flow for exposure to and heating by solar radiation. Common to all the channels are inlet and outlet manifolds through which, respectively, the water is directed into and discharged from the channels. Construction of the panel is simplified and is rendered economical by fashioning of the same from a pair of superposed, inexpensive metal sheets, as for example roofing tin. The sheets are readily preformed with the manifolds and channels, in such fashion that when the sheets are connected along their peripheries by means of mechanical expedients well known in the sheet metal art, the several channels are automatically defined between the sheets, and are further automatically brought into communication with the inlet and outlet manifolds. By means of spot welding or the like, the sheets are firmly, permanently connected together, and the spot welding arrangement permits a cross flow between channels, to assure maximum exposure of the liquid to the effects of solar radiation.

A panel assembly is also disclosed, making use of the solar panel described above. The panel assembly is similarly inexpensively formed, through the provision of a supporting frame readily fashioned from an extrusion of aluminum or the like, said frame being designed with inwardly facing slots, adapted respectively to receive an outer glass panel, an inner glass panel, the solar panel disclosed above, a plywood base, and insulation interposed between the panel and base.

2 Claims, 8 Drawing Figures

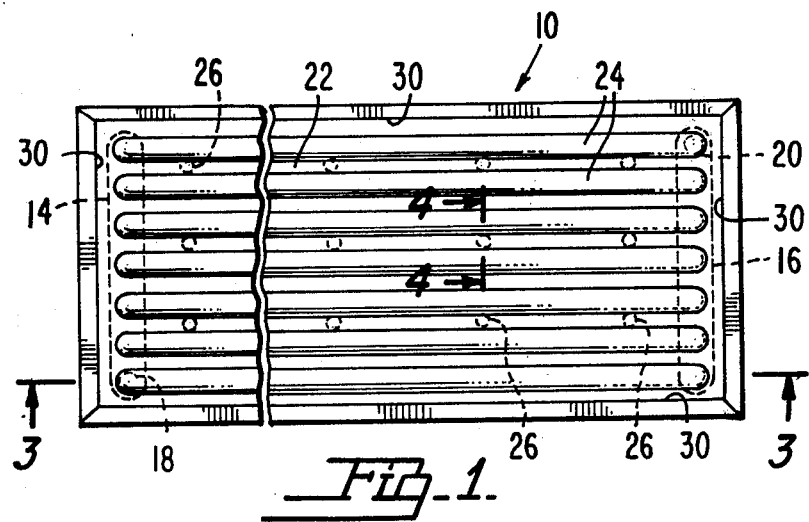
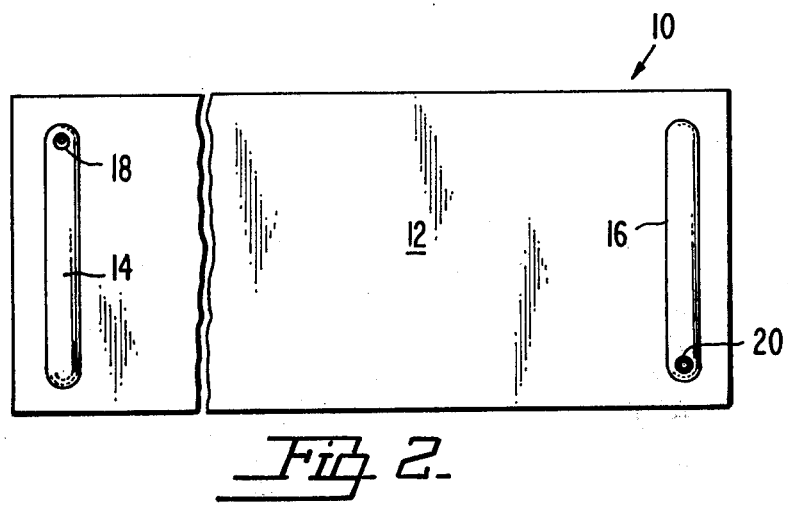
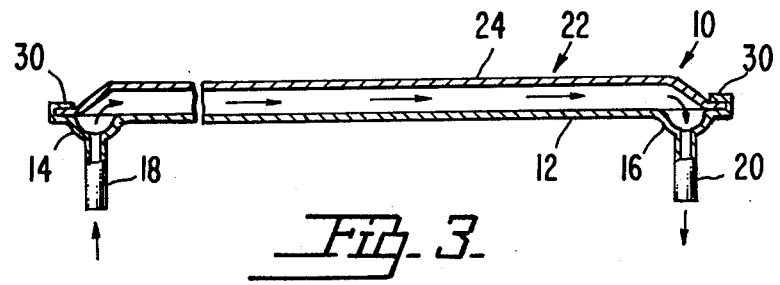
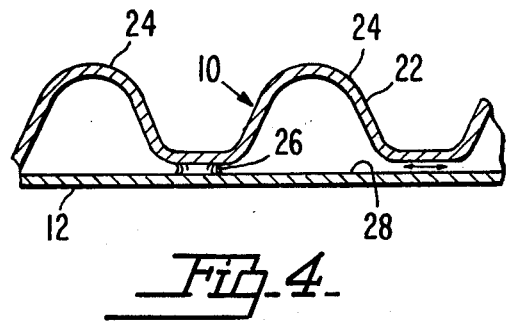

SOLAR PANEL AND PANEL ASSEMBLY

BACKGROUND OF THE INVENTION

1. Field of the Invention

The invention pertains generally to solar panels and assemblies therefor, and more particularly to a solar heat collector panel and assembly coming under the general classification of solar heaters, and classified in a more particular sense as a solar heater especially adapted for heating water pumped through the collector panel.

2. Description of the Prior Art

Among the most important directions in which research is presently being conducted for the purpose of conserving energy, is in the development of solar heating systems. Many of these have been designed, for example, for use in residences, although obviously they are not restricted to this particular usage. In a solar heating system, it is well known to provide an assemblage of like, solar heat collector panels. These are joined to provide a bank of said panels, and this grouping of the collector panels is often so arranged as to be especially adapted to be exposed to the rays of the sun. Typically, water is pumped through the panels, and is heated by the solar energy to which the panels are exposed. The water may thereafter be utilized for any suitable purpose, as for example, the heating of the residence in which the collector panels are mounted, the heating of water in a domestic hot water heating system, or perhaps for both of these highly desirable purposes.

One of the problems that has been encountered in the prior art resides in the excessive cost of manufacture of solar heat collection panels of the type described. In many instances, these require, by reason of their inherent design, the use of highly expensive metals or other materials of which the panel is to be constructed.

Or, it is often true that high costs result from the relatively complex design of the components of the collector panel. Again, this is a factor that contributes to an undesirably great expense in the initial manufacture of the panels, and as a result this has militated against the commercial development of the collector panels.

In still other instances, it has been found that the cost of assembling the components of the panels has been too great. Once again, the high cost of manufacture of the collector panel has prevented its widespread commercial development, even though the panel itself may operate with a high degree of efficiency.

All of these factors have contributed toward slowing the development of solar heating systems, and in particular the development of solar heat collector panels designed specifically for employment in such systems.

SUMMARY OF THE INVENTION

The present invention aims to overcome many of the difficulties that have heretofore been encountered in the development and manufacture of solar heat collector panels. It is proposed to accomplish this by providing a collector panel, and a panel assembly that utilizes the panel as its main component, such as to first of all permit the use of very inexpensive materials, specifically a low cost sheet metal such as is commercially known as roofing tin.

Secondly, the invention comprises a solar heat collector panel wherein the number of components required for manufacture of the complete panel is kept to a complete minimum. In particular, the panel comprising the present invention makes use of two rectangular, superposed sheets of inexpensive roofing tin, the lower sheet being folded over the periphery of the upper sheet and being secured along said periphery, by inexpensive mechanical expedients well known in the roofing trade.

The invention further comprises the stamping of the superposed sheets with integral corrugations, the several corrugations of the upper sheet extending in one direction, in parallel relation, normally longitudinally of the upper sheet. The corrugations of the lower sheet extend transversely of the lower sheet, at its ends, in perpendicular relation to the corrugations of the upper sheet. Upon connection of the sheets, the corrugations of the lower sheet are automatically brought into communication with the ends of the corrugations or channels of the upper sheet, so as to define inlet and outlet manifolds, through which water is supplied to and discharged from the channels of the upper sheet. In this way, the invention provides a basic solar heat collector panel of exceedingly inexpensive design and construction, both as to the materials used therein and as to the labor required for construction of the completed panel.

Summarized further, the invention also includes a solar heat collector panel assembly, that comprises a frame that can be readily formed from extruded materials such as aluminum or the like, and which is so designed as to define a plurality of superposed slideways or retention slots. The panel assembly includes, as its outermost component, a pair of spaced glass panel members, which when mounted define between them a dead air space, so as to provide a desirable outer insulative effect while still permitting free and full passage of the rays of the sun to the above described collector panel, which is mounted in the frame immediately below the dual glass pane structure.

Also mounted in the frame, below the collector panel, is a thickness of thermal insulation, which could, for example, comprise the insulation sold under the name "Fiberglass" manufactured and sold by Dow-Corning Corp. of Midland, Michigan. The insulation is sandwiched between the solar heat collector panel and a base of plywood or the like.

The panel assembly described can be joined with other similar assemblies, in a roof of a dwelling or commercial establishment, in a position such as to utilize to the maximum the solar radiation energy directed against the roof. Water pumped through the several collector panels of the panel assemblies that are so arranged is thus heated and directed elsewhere for the purpose of heating the interior of the building, heating water in a domestic hot water system, or for any other purposes found desirable or necessary.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of one of the solar heat collector panels, per se, constructed according to the present invention, a portion being broken away;

FIG. 2 is a bottom plan view thereof, portions being broken away;

FIG. 3 is a longitudinal sectional view of the collector panel, portions being broken away, taken substantially on line 3—3 of FIG. 1;

FIG. 4 is an enlarged, detail sectional view taken transversely through the collector panel, substantially on line 4—4 of FIG. 1;

DETAILED DESCRIPTION OF THE PREFERRED EMBODIMENT

Figure 5:
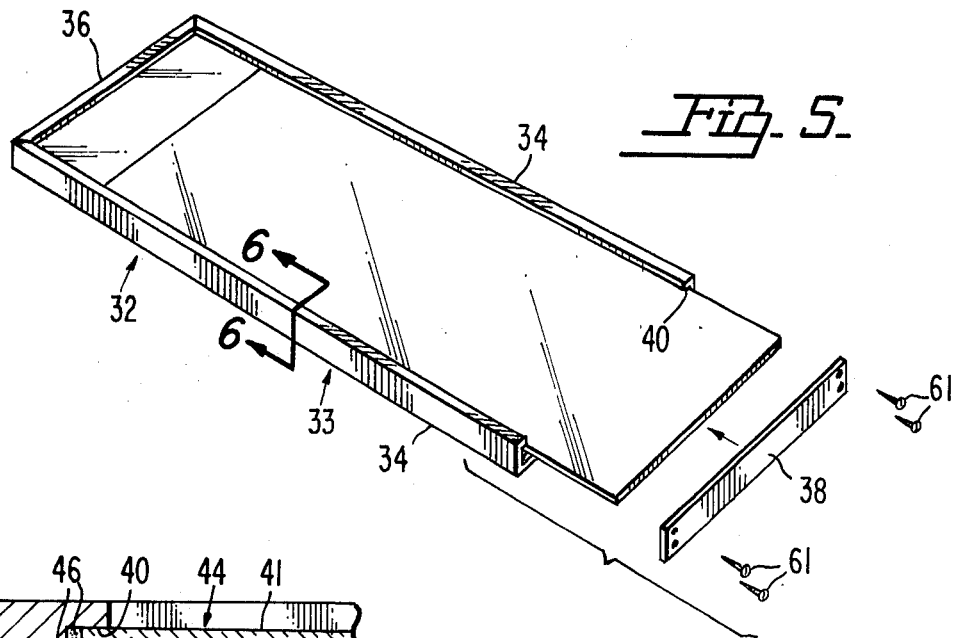
FIG. 5 is a partially exploded perspective view, illustrating one of the panel assemblies as it appears in a partially assembled state.

The solar heat collector panel 10 illustrated in FIGS. 1-3 includes a flat, elongated, rectangular bottom sheet 12 formed in a preferred embodiment of an inexpensive yet durable and strong metal, as for example, common roofing tin suitably plated or coated to ward off corrosion. The bottom sheet 12, as seen from FIG. 2, includes, at one end, a transverse corrugation 14 terminating at its opposite extremities in closely spaced relation to the opposite longitudinal edges of the bottom sheet. At the opposite end of the bottom sheet 12 there is formed a similar corrugation 16, extending transversely of the bottom sheet. Corrugations 14, 16 respectively define inlet and outlet manifolds for the solar heat collector panel, and in a preferred embodiment, are integrally stamped or formed in the bottom sheet, as readily seen from FIG. 3. Thus, there is provided a simple and highly inexpensive way of defining the inlet and outlet manifolds, without necessity of attaching special channels formed separately from the bottom sheet itself.

As seen from FIG. 2, attached to the corrugation 14, at one end thereof, is an inlet pipe 18, which supplies water to the manifold 14 from a suitable source, as for example, the inlet pipe may extend from the outlet end of a domestic hot water system or domestic hot water heating system, so as to provide the panel with a continuous source of water for reheating by solar energy, after heat has been taken from the water during passage thereof through the domestic hot water heating system.

Preferably, the inlet pipe 18 opens into the inlet manifold 14 at a location adjacent an end of the inlet manifold, near one corner of the collector panel.

Outlet manifold 16 is similarly formed near the opposite end of the bottom sheet 12, and in similar fashion is connected to an outlet pipe 20, which returns to the domestic system the water that has been heated by solar energy after passing from the inlet manifold 14 over the full length of the panel 10, to the outlet manifold 16. In the preferred embodiment, the outlet pipe 20 is located adjacent a corner of the panel 10 diametrically opposite the corner near which the inlet pipe 18 is disposed.

No effort has been made herein to indicate the pump, or the components of the hot water heating system from which the water flows to the pipe 16 for reheating within the panel, and for recirculation back to the hot water heating system via the outlet pipe 20. The components of a complete hot water heating system are known in and of themselves, and as an example, the panel 10 comprising the present invention could be connected in a system such as has been disclosed in U.S. Pat. No. 4,029,080 issued to Warren on June 14, 1977.

The solar heat collection panel 10 includes as a second main component thereof, an upper sheet 22. This, like the lower sheet, is formed of an inexpensive sheet metal material such as roofing tin protectively coated to resist corrosion.

The upper sheet 22 is formed with a plurality of straight, elongated longitudinal corrugations 24, terminating in closely spaced relation to the opposite ends of the upper sheet, and disposed in closely spaced, parallel relation over substantially the entire area of said upper sheet. As seen from FIG. 3, the longitudinal corrugations are integrally stamped or otherwise preformed in the roofing tin material of which the upper sheet is constituted, and open at their opposite ends into communication with the inlet and outlet manifolds 14, 16 respectively. Thus, merely by stamping the corrugations into the material of the lower and upper sheets, a complete pattern of flow channels results, covering substantially the entire area of the panel 10, with said pattern of flow channels resulting merely in response to peripheral connection of the sheets to one another. At the same time, the formation of the transverse and longitudinal corrugations in the bottom and upper sheet respectively provides for a strengthening or rigidifying of the sheet material, so that each sheet has a built-in resistance to deformation from its generally planar form.

As seen from FIG. 4 and also from FIG. 1, the upper and lower sheets are spot welded together at locations 26 occurring at spaced intervals along the length of the panel, between adjacent longitudinal corrugations 24 of the upper sheet. The provision of the spot welds 26 at spaced locations, leaves water free to flow between adjacent longitudinal corrugations at all points where the spot welds have been omitted, as shown at 28 in FIG. 4. This cross-flow of water between adjacent longitudinally extending corrugations 24 assures that there will be a uniform dispersion of the water over the entire area of the solar heat collection panel, with the water thus being given maximum exposure to solar radiation so as to correspondingly assure the greatest amount of efficiency in respect to elevating the temperature of the water as it passes from the inlet to the outlet pipes 18, 20 respectively. Further, the passage of the water through the low, shallow cross-flow areas 28 occurring between adjacent longitudinal corrugations, in effect causes the water to be formed into a relatively thin sheet of water as it passes through the cross-flow areas, thus still further improving the exposure thereof to solar energy and increasing the heating effect achieved by the panel structure that comprises the present invention.

As previously noted herein, the use of superposed sheets of inexpensive metal material such as roofing tin permits the sheets to be connected at their peripheries by inexpensive means that lends itself to mass production methods. Thus, in the illustrated, preferred embodiment (see FIGS. 1 and 6), the material of the bottom sheet is folded along its several edges over the corresponding edges of the upper sheet, as shown at 30. Over the full length of the fold, any suitable means is employed to prevent leakage through the joint, as for example, the welding of the folded over edge 30 to the edge of the upper sheet can be used as shown at 31 in FIG. 6. Or, any suitable sealing material, not shown, can be employed between the folded over edges. Means for joining separate sheets of metal material in a manner to prevent leakage are of course well known in the sheet metal art, and hence need not be specially illustrated and described herein other than by showing one such means as at 31.

A solar heat collector panel 10 formed as illustrated and described herein can be employed advantageously in any of various environments, that is, it can be used in any of various supporting frames or mountings where it will receive full exposure to the rays of the sun and hence will discharge its intended function efficiently. In this connection, one such arrangement is illustrated in FIGS. 5-8 and is believed in itself to be a novel and efficient way of utilizing a solar panel such as has been illustrated in FIGS. 1-4. In FIGS. 5-8, and considering first the form shown in FIGS. 5 and 6, the solar panel 10 has been illustrated in a panel assembly generally designated 32 formed in the illustrated embodiment as an elongated, flat, rectangular unit capable of being assembled with other, similar units in a roof of a building, not shown, such as shown, for example, in the above mentioned Warren patent. It will be understood, in this regard, that when a plurality of the panel assemblies 32 are mounted in side and end abutting relation, the inlet pipes 18 can all extend from a common source of water that needs to be reheated after passage through the domestic hot water heating system. Similarly, the outlet pipes 20 of the several collector panels 10 of panel assemblies 32 can all extend into a common conduit, not shown, through which the heated water is returned to the domestic hot water heating system after being reheated within the solar panels 10.

In any event, the panel assembly 32 in a preferred embodiment includes a rectangular frame 33 which, in the illustrated embodiment includes a pair of longitudinal frame members 34, and end frame members 36, 38. The longitudinal frame members 34 can be formed of extruded aluminum or other material capable of being readily formed to the cross-sectional configuration shown in FIG. 6 or in FIG. 7. It may be possible, for example, to utilize a suitable extrudable plastic material, and it is mainly important that the material be capable of manufacture at relatively low cost, and have the requisite characteristics of durability, resistance to warpage, and strength in retaining in their proper relationship the housed components of the frame assembly.

Figure 6:
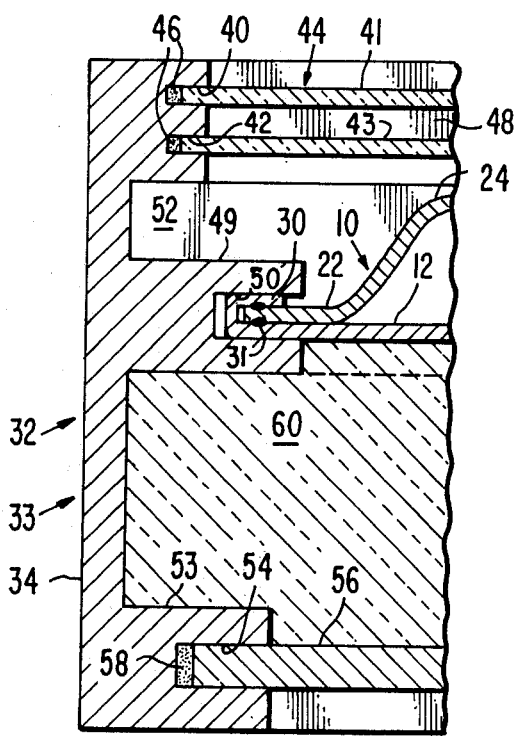
FIG. 6 is a greatly enlarged, fragmentary, detail transverse sectional view through one of the sides of the panel assembly, substantially on line 6—6 of FIG. 5.

In a preferred embodiment, the end frame member 36 would be first joined permanently to the respective longitudinal frame members 34, and could be of a cross-sectional configuration similar to that provided for the end frame members and shown in FIG. 6. The end frame member 38, however, is preferably a removable member, which initially is left off for the purpose of permitting the several components of the assembly to be slid into the initially three-sided frame comprised of the members 34 and the end frame member 36. For example, the end frame member 38 might be a simple, flat piece such as shown in FIG. 5, that is, it need not have inwardly facing slots such as are shown in the cross-sectional view of the longitudinal frame member 34 and that may be incorporated in the permanently attached frame member 36.

In this connection, and considering the particular cross-sectional configuration of the longitudinal frame members or sides 34 of the assembly, each of said frame members 34 includes, adjacent its top surface, inwardly facing guide or retention slots 40-42 into which may be slid glass panes 41-43 respectively. If desired, other transparent material can be utilized instead of glass, but in the illustrated example glass is employed and the panes are separated to define between them a dead air space 48. The panes 41, 43 cooperate to define a transparent, double-paned transparent cover panel unit generally designated 44, which provides protection against the rain and the elements in general, and provides against heat loss in a direction outwardly of the assembly 32, while still permitting the free passage of the rays of the sun for the purpose of providing efficient heating of water flowing through the channels of the collector panel 10.

If desired, the glass panes 41, 43 can be sealably engaged in their respective retention slots, through the provision of a suitable flowable sealant 46. In this way, the assembly 42 is provided with an insulated, transparent outer covering defined by the unit 44, and said covering is easily assembled merely by bedding of the glass panes in the respective slots 40, 42.

Inwardly spaced from the transparent unit 44 is an inwardly projecting ledge or rib 49, extending continuously along the full lengths of the longitudinal frame members 34. Rib 49 is formed with an inwardly facing retention slot 50, adapted to receive the sealed, folded edge 30 of the solar collector panel as shown to best advantage in FIG. 6. It will be understood that a suitable sealant or adhesive can be employed to maintain the solar panel in place after it is slid into the slots 50, this being considered sufficiently obvious as not to require special illustration herein.

In a preferred embodiment, a space 52 is left between the glass unit 44 and the collector panel 10, and this provides an additional insulative effect between the solar panel and the glass unit itself.

Referring to FIG. 6, integrally formed at the base or bottom of each of the frame members is an inwardly projecting, longitudinal base rib 53, having an inwardly facing retention slot 54 adapted to receive the opposite side edges of a plywood base panel 56, which can be sealably retained within the associated slots 54 by means of a suitable adhesive 58. A substantial space is left between the panel 10 and the plywood base member 56, and this space is preferably filled with a suitable heat insulation material 60, as for example "Fiberglas", a material made and sold under this mark by Dow-Corning of Midland, Michigan.

In a preferred embodiment, the total thickness of one of the assemblies 32 would be on the order of perhaps 3 and ½ inches, so that the space occupied by the insulation 60 might well be on the order of about 1 and ½ inches, although of course it will be understood that these dimensions are merely rough and approximate, and are not critical to successful operation of the invention.

It may further be noted that the assembly may proceed as follows: first, with the frame left open at one end, the panel 56 can be slid into the frame through the open end thereof to provide a base for the insulation 60. Then, the insulation can be applied in superposed relation to said base. Thereafter, the collector panel 10 is slid into place, through the open end, being captured within the retention slots 50. Glass panel element 43 is then inserted, and finally the glass panel element 41 is inserted as shown in FIG. 5. When the several components have been mounted in the frame in this way, the end frame member 38 is applied, and for example, can be secured in position closing the hitherto open end of the frame, through the provision of screws 61 (see FIG. 5).

Figure 7:
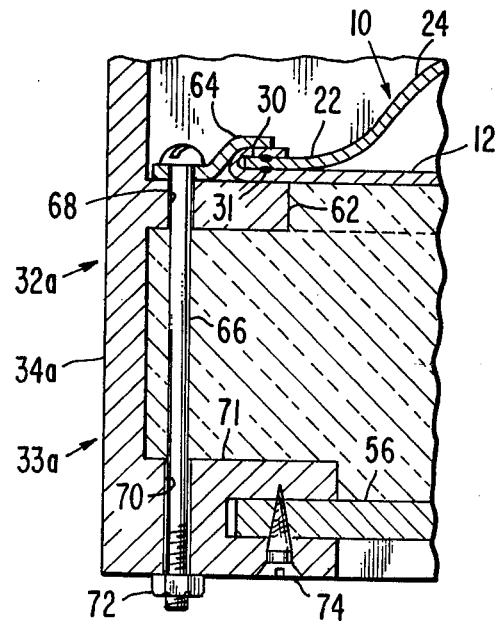
FIG. 7 is a view similar to FIG. 6, showing a modified construction.
Figure 8:
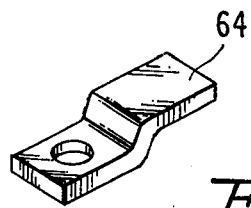
FIG. 8 is an enlarged, perspective view of a hold-down clip used in the modified form illustrated in FIG. 7.

In FIG. 7 there is illustrated a modified or alternative construction for the panel assembly. In this figure the panel assembly has been designated 32a, and includes side frame members 34a cooperating with end frame members to define a rectangular frame 33a. The end frame members can be as shown in FIG. 5, that is, one end frame member can be permanently secured to the respective longitudinal frame members to provide an initially three-sided frame, and the remaining frame member can be applied after the several panel elements 56, 10, 43, and 41 have been inserted.

In any event, the cross-sectional configuration of the sides 34a of the frame differs somewhat from that shown in FIG. 6, since in this case, the solar panel 10 is held in place not by engagement in opposed, facing retention slots 50, but rather, by means of hold down clips. In FIG. 7 there are provided inwardly facing support ledges 62 for the panel 10, with the edges of the panel resting upon said ledges. At suitable locations along the length of the panel 10, hold down clips 64 are utilized, said clips having off-set ends cooperating with the ledge 62 to clamp the solar panel in place between the clips and the ledge. The clips are forced down tightly against the edges of the solar panel through the provision of elongated bolts 66, which extend through registering openings 68, 70 formed in ledge 62 and base rib 71 respectively. Nuts 72 are applied to the several bolts, and when tightened, cause the clamps 64 to bear tightly against the opposite sides of the solar panel.

Either the FIG. 6 or the FIG. 7 arrangements can be employed advantageously, according to the desires of the particular manufacturer.

The plywood panel 56 can be mounted as shown in FIG. 6, or alternatively, in either form of the invention can be held in place through the provision of suitably spaced wood screws or the like threaded into the plywood panel from the bottom of the frame assembly.

The several assemblies 32 can be mounted and incorporated in a roof structure in any suitable fashion, or alternatively could be embodied in a wall structure or in fact in any arrangement designed to facilitate the application of solar radiation energy to the collector panel 10. The arrangement shown in the above mentioned Warren patent, for example, is typical, and can be employed advantageously, utilizing panels formed according to the present invention.

It will be noted that considering the construction of the solar panel 10 in and of itself, this panel can be manufactured at very low cost and yet provides an efficient panel adapted to produce maximum exposure of water passing therethrough, to the rays of the sun, and adapted to promote maximum heat transfer for the purpose of efficiently heating the water or other liquid pumped through or otherwise caused to pass through the panel from the inlet to the outlet thereof. Inexpensive materials can be employed, and the labor involved in assembling the top and bottom sheets need not be skilled labor, thus reducing the cost of manufacture considerably. Even so, the construction, though inexpensive, is designed to promote maximum efficiency as regards the heating of the water passing through the panel, by integral stamping of the communicating transverse and longitudinal corrugations in the bottom and top sheets respectively, accompanied by the promotion of cross-flow between adjacent longitudinal channels with a view to assuring uniform dispersion of the water over the entire area of the solar panel, by forming of the water into a thin sheet of material which flows through the cross-flow areas 28, to promote heat transfer and as a consequence maximize the efficiency of the collector panel during normal use thereof.

The provision of a solar panel as described further facilitates its utilization as a component of a panel unit such as shown at 32 or 32a. The panel unit itself can be assembled at relatively low cost, by reason of the provision of the several guide slots and simple mounting means shown in FIGS. 6 and 7. Yet, a highly efficient frame assembly is provided, having an insulative outer cover means 44 that is yet adapted to freely pass the rays of the sun, an inner insulative means 60, a suitable base 56 which itself can have insulative value, and an open space such as shown at 52 between the collector panel and the protective outer cover means 44.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A solar heat collector panel comprising: a first sheet having an inlet and an outlet manifold; and a second sheet in superposed relation to the first sheet and connected at its periphery to the first sheet, the second sheet having a plurality of channels communicating with and extending between the inlet and outlet manifolds, the inlet and outlet manifolds being formed in closely spaced relation to the respective, opposite ends of the first sheet as corrugations formed out of the material of the first sheet, the material of the first sheet being otherwise generally flat between the opposite ends thereof, said corrugations being disposed wholly to one side of the general plane of the first sheet, the channels of the second sheet being defined by a plurality of closely spaced, parallel corrugations extending substantially from end to end of the second sheet between the inlet and outlet manifolds of the first sheet, said corrugations of the second sheet being pressed out of the general plane of the second sheet in a direction opposite to that in which the corrugations of the first sheet are extended, the opposite ends of the corrugations of the second sheet being disposed in communication with the corrugations defining said inlet and outlet manifolds of the first sheet, the material of the first and second sheets being spot welded at locations spaced along the lengths of said sheets and occurring between adjacent corrugations of the second sheet, the sheets being spaced apart at locations between the spot welds providing cross-flow areas between adjacent corregations of the second sheet.

2. A solar heat collector panel as in claim 1 wherein said cross-flow between adjacent ones of the second named corrugations are located over substantially the full length thereof, the sheets being spaced apart by the spot welds between said adjacent second named corrugations defining shallow, flat, open areas between the sheets alternating with and extending in parallel relation to the second named corrugations, and communicating with said second named corrugations for substantially the entire length thereof.

* * * * *